(No Model.)
J. GAWRON.
CLUTCH.
No. 511,047.
Patented Dec. 19, 1893.
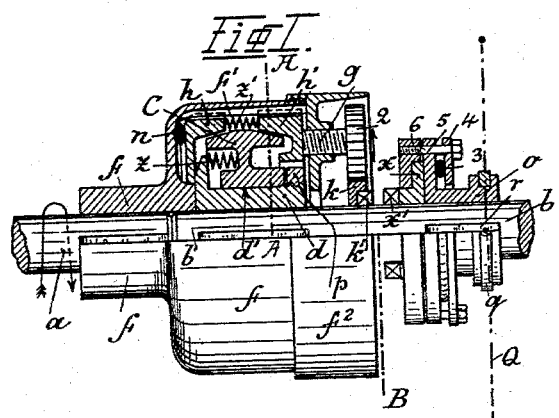
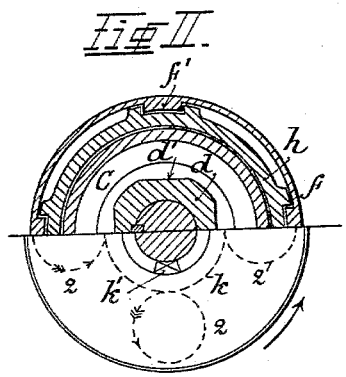
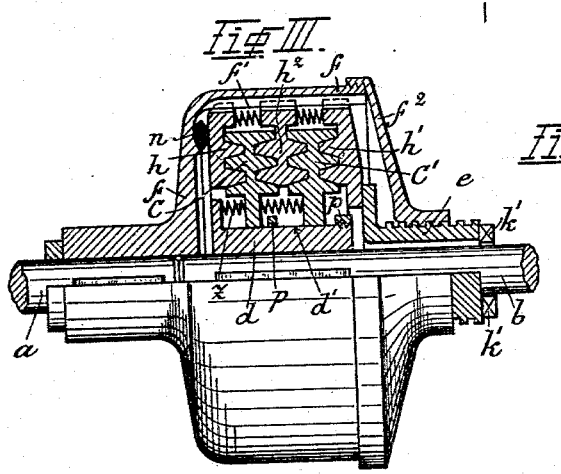
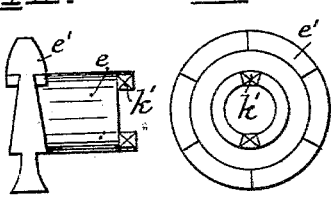
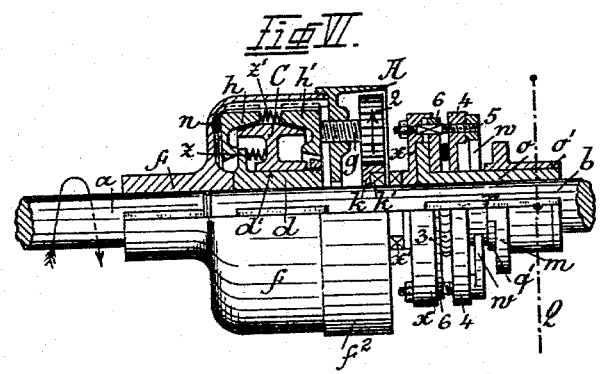
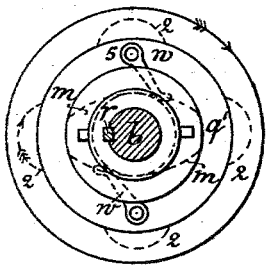
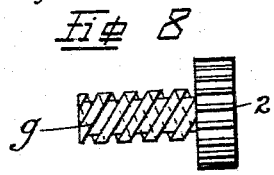
Witnesses
Jno. F. Doran Jr.
Walter Allen
Inventor
Josef Gawron
By Attorney
Herbert W. Jenner

UNITED STATES PATENT OFFICE.

JOSEF GAWRON, OF BERLIN, GERMANY, ASSIGNOR TO MARIE GAWRON, OF SAME PLACE.

CLUTCH.

SPECIFICATION forming part of Letters Patent No. 511,047, dated December 19, 1893.

Application filed July 17, 1893. Serial No. 480,736. (No model.) Patented in England September 22, 1892, No. 17,162.

*To all whom it may concern:*

Be it known that I, JOSEF GAWRON, of Berlin, in the Kingdom of Prussia and German Empire, have invented certain new and useful Improvements in Shaft-Couplings, of which the following is a specification.

Letters Patent have been obtained for this invention in Great Britain, No. 17,162, dated September 22, 1892.

This invention consists in the novel construction and combination of the parts forming the shaft coupling as hereinafter fully described and claimed.

In the drawings: Figure 1 is a side view of the coupling partly in section; and Fig. 2 is an end view taken in part section on the line A A in Fig. 1. Fig. 3 is a side view of a modification of the coupling, partly in section. Fig. 4 is a detail side view showing a device which can be used instead of the screw shown in Fig. 3; and Fig. 5 is an end view of the same. Fig. 6 is a side view of a second modification of the coupling, also partly in section; and Fig. 7 is an end view of the same. Fig. 8 is a detail side view of one of the screws $g$ drawn to a larger scale.

A shell $f$ is permanently secured to one shaft $a$, which is arranged in line with the shaft $b$ to which it is to be coupled. A sleeve $d$ is secured on the shaft $b$, and is provided with flat portions $d'$ on its periphery. C is a double-coned friction-clutch which is mounted on the sleeve $d$. A collar $p$ is secured on the sleeve to prevent the clutch C from moving too far in one direction, and $z$ is a spring for forcing the clutch C toward the collar $p$. The clutch C is splined on the sleeve $d$, being free to slide longitudinally and coupled circumferentially by the flat portions $d'$. Two single-cone friction-clutches $h$ and $h'$ are arranged inside the shell $f$, one on each side of the clutch C. Guides $f'$ are formed on the inside of the periphery of the shell $f$, and the clutches $h$ and $h'$ are provided with lugs which engage with the said guides $f'$ so that the clutches revolve with the shell $f$ and shaft $a$, and are free to move longitudinally of the shaft. A buffer $n$ of elastic material is interposed between the side of the shell and the clutch $h$. A spring $z'$ is placed between the clutches $h$ and $h'$ and normally holds them clear of the double clutch C. A cover plate $f^2$ is secured over the open end of the shell $f$, and incloses the clutches. The periphery of the shell $f$ may be used as a belt pulley, or it may be provided with teeth so that it may be driven by a toothed wheel or a chain. The two shafts $a$ and $b$ are coupled by pressing the clutch $h'$ toward the clutch $h$. This slides the double clutch C on its sleeve, and all the friction faces of the clutches are pressed together. The spring $n$ gives elasticity to the grip of the clutches. The clutches are released by the springs $z$ and $z'$ when the end pressure on the clutch $h'$ is taken off.

In Fig. 3, two double clutches C and C' are shown, and a double clutch-ring $h^2$ is interposed between them. As many double clutches and double clutch-rings as desired may be used, to increase the area of the friction faces of the clutches. The clutch-ring slides in the guides $f'$ and each double clutch is provided with a stop $p$ and releasing springs.

In Figs. 1 and 6, the clutch $h'$ is moved by means of screws $g$ which engage with screw-threaded holes in the cover plate $f^2$. The pitch of the screwthreads is made so great that the screws are revolved and forced endwise by the springs $z$ $z'$ when the clutches are released.

A toothed wheel $k$ is journaled on the shaft $b$ and is provided with a clutch jaw $k'$. Toothed wheels 2 are secured on the ends of the screws $g$, and gear into the wheel $k$. A disk $x$ is arranged to revolve with the shaft $b$, and is provided with a clutch jaw $x'$. When the disk $x$ is slid lengthwise of the shaft $b$ so that the jaws $x'$ and $k'$ engage, the wheel $k$ is revolved and turns the wheels 2 and the screws $g$ so that the clutch $h'$ is forced toward the clutch $h$ to couple the shafts $a$ and $b$ as hereinbefore described.

Instead of the screws $g$ and wheels 2 and $k$, a single sleeve $e$ may be used as shown in Fig. 3. This sleeve $e$ is provided with screw-threads of very great pitch, or it may have inclined portions $e'$ as shown in Figs. 4 and 5. These inclined portions $e'$ are equivalent to portions of screwthreads, and they engage with correspondingly shaped parts in the cover plate $f^2$. The friction clutches are pressed into engagement by sliding a clutch jaw into gear with the clutch jaw $k'$, the same as hereinbefore described, and the sleeve $e$ is pushed back by the springs $z$ and $z'$ when the clutch jaws $x'$ and $k'$ are separated.

In Fig. 1, the disk $x$ is not splined direct to the shaft $b$. A sleeve $o$ is splined to the shaft $b$ and is provided with a circumferential groove. A ring $q$ is arranged in this groove and is operated by a lever in the ordinary approved manner of sliding clutch-sleeves. The dotted line Q indicates the position of the said lever. The sleeve $o$ is provided with a disk which bears against one side of the disk $x$, and 6 is a disk which bears against the other side of the disk $x$. A plate 4 encircles the sleeve $o$, and 3 is a spring for causing the disks 5 and 6 to bear on the disk $x$ with a yielding pressure. 5 are bolts which pass through the plate 4 and disk 6, and press the disk $x$ against the disk on the sleeve $o$. The disk $x$ is arranged to slip when the clutch jaws $x'$ and $k'$ are suddenly brought together, and the amount of the slip is regulated by turning the bolts 5 by hand.

A modification of this device is shown in Figs. 6 and 7 in which the pressure on the disk of the sleeve $o$ is increased after the clutch jaws $x'$ and $k'$ have been moved into engagement. In this modification, the ring $q$ is replaced by a sleeve $q'$ which has cams $m$ on one end. A collar $o'$ is secured on the end of the sleeve $o$ to prevent the sleeve $q'$ from slipping over its end. The bolts 5 are secured to the disk $x$ at one end, and pass through holes in the disks 6 and 4. The ends of the bolts have screwthreads of very great pitch, and $w$ are arms provided with screwthreaded bosses which engage with the ends of the bolts. The free ends of the arms $w$ lie in proximity to the periphery of the sleeve $o$. When the sleeves $o$ and $q'$ are moved to the left in Fig. 1, the clutch jaws $x'$ and $k'$ are brought together and the cams $m$ are brought under the ends of the arms $w$. The motion of the revolving sleeve $o$ is communicated to the disk $x$, which moves the bolts 5 and the arms $w$ circumferentially of the cams $m$, and the arms are lifted by the cams so that the bolts are caused to press together the disk $x$ and the disk on the sleeve $o$ with increased force. When the sleeves $o$ and $q'$ are moved to the right in Fig. 6, and the clutch jaws $x'$ and $k'$ are disengaged, the spring 3 releases the disks from the increased pressure, the pitch of the screwthreads on the bolts 5 being so great as to permit the springs to move the bosses of the arms $w$ lengthwise of the bolts.

What I claim is—

1. In a coupling, the combination, with a shaft $a$, and a shell secured thereon and provided with guides $f'$, on the inside of its periphery of two single-cone friction-clutches sliding in the said guides, a spring forcing the said clutches apart, a shaft $b$, a sleeve secured on the said shaft $b$ and provided with a stop, a double-cone friction-clutch splined to the said sleeve between the aforesaid clutches, a spring pressing the said double-cone clutch toward the said stop and means for forcing the said clutches into engagement, substantially as set forth.

2. In a coupling, the combination, with a shaft $a$, and a shell secured thereon and provided with guides $f'$ on the inside of its periphery, of two single-cone friction-clutches sliding in the said guides, the spring buffer $n$ interposed between the inner clutch and the side of the shell, a spring forcing the said clutches apart, a shaft $b$, a sleeve secured on the said shaft $b$ and provided with a stop, a double-cone friction-clutch splined to the said sleeve between the aforesaid clutches, a spring pressing the said double-cone clutch toward the stop, and means for forcing the said clutches into engagement, substantially as set forth.

3. In a coupling, the combination, with a shaft $a$, and a shell secured thereon and provided with guides $f'$, on the inside of its periphery of two single-cone friction-clutches sliding in the said guides, a shaft $b$, a sleeve secured on the shaft $b$ and provided with stops, double-cone friction-clutches splined to the said sleeve between the aforesaid clutches, a double clutch-ring sliding in the said guides between the double-cone clutches, springs normally holding apart all the friction faces of the said clutches, and means for forcing the said clutches into engagement, substantially as set forth.

4. The combination, with the parts of a friction clutch, and springs normally holding apart the said parts of the clutch; a plate revolving constantly with one part of the clutch, a screw of very great pitch engaging with the said plate, with its end bearing against one part of the clutch and adapted to be revolved in one direction by the said springs, and means for revolving the said screw in the other direction, whereby the parts of the clutch are pressed together, substantially as set forth.

5. The combination, with the parts of a friction clutch, and springs normally holding apart the said parts of the clutch; of a plate revolving constantly with one part of the clutch, the screws $g$ of very great pitch engaging with the said plate and adapted to be revolved in one direction by the said springs, the toothed wheels 2 secured on the ends of the said screws, a central toothed wheel $k$ gearing into the wheels 2 and provided with a clutch jaw $k'$, and a sliding disk provided with means for revolving it and a clutch jaw $x'$ adapted to engage with the clutch jaw $k'$, whereby the parts of the clutch are pressed together, substantially as set forth.

6. In a coupling, the combination, with the shaft $b$, and the revoluble clutch jaw $k'$ mounted thereon; of the disk $x$ mounted on the said shaft and provided with the clutch jaw $x'$, the sleeve $o$ splined on the said shaft, the disks 6 and 4 mounted on the said sleeve, the spring 3 interposed between the disks 6 and 4, the bolts 5 secured to the disk $x$ and having screwthreads of very great pitch and passing through holes in the disks 6 and 4, the arms $w$ screwed on the ends of the said bolts, and the sliding sleeve $q'$ mounted on the sleeve $o$ and provided with cams $w$ for raising the said arms, substantially as and for the purpose set forth.

In testimony whereof I affix my signature in presence of two witnesses.

JOSEF GAWRON.

Witnesses:
  PAUL AULICH,
  REINHOLD WEIDNER.